United States Patent

Clark et al.

[11] 4,034,059
[45] July 5, 1977

[54] SEPARATION OF COBALT FROM NICKEL BY OZONATION IN THE PRESENCE OF AMMONIUM SALTS

[75] Inventors: Franklin F. Clark; Cvetko B. Nikolic; Paul B. Queneau, all of Golden, Colo.

[73] Assignee: Amax Inc., Greenwich, Conn.

[22] Filed: July 19, 1976

[21] Appl. No.: 706,817

[52] U.S. Cl. .................. 423/144; 423/592
[51] Int. Cl.² .......................... C01G 51/04
[58] Field of Search .......... 423/140, 143, 144, 147, 423/592, 392; 75/103, 108, 119

[56] References Cited

UNITED STATES PATENTS

| | | | |
|---|---|---|---|
| 2,506,159 | 5/1950 | Mantell | 423/143 |
| 2,767,055 | 10/1956 | Schaufelberger | 75/119 |
| 2,786,751 | 3/1957 | Roy | 75/108 |
| 2,842,427 | 7/1958 | Reynaud | 423/592 |
| 2,971,836 | 2/1961 | Hall | 423/140 |

FOREIGN PATENTS OR APPLICATIONS

| | | | |
|---|---|---|---|
| 159,813 | 1964 | U.S.S.R. | 423/592 |

Primary Examiner—Earl C. Thomas
Assistant Examiner—Brian Hearn
Attorney, Agent, or Firm—Kasper T. Serijan; Eugene J. Kalil

[57] ABSTRACT

A method is provided for separating cobalt from a nickel solution containing cobalt in the cobaltous state and an ammonium salt comprising subjecting said solution containing at least 0.2 grams per liter of ammonium ion to ozonation while maintaining the pH thereof from about 4.5 to 6, until said cobalt has been oxidized to the cobaltic state and simultaneously precipitating said cobalt in the cobaltic state at a temperature ranging from about 10° to 90° C.

7 Claims, 5 Drawing Figures

SEPARATION OF COBALT FROM NICKEL BY OZONATION IN THE PRESENCE OF AMMONIUM SALTS

This invention relates to an ozonation method for separating cobalt from nickel solutions and, in particular, to a method for efficiently rejecting cobalt from nickel sulfate solutions containing an ammonium salt.

BACKGROUND OF THE INVENTION

Nickel and cobalt are generally found together in natural-occurring minerals and, because conventional ore dressing methods do not effect a separation of the two, both metals generally appear together in solutions resulting from the leaching of nickel and cobalt-containing materials, such as leached oxide ores, sulfide concentrates and the like.

One method for the recovery of nickel and/or cobalt from oxide ores, such as lateritic limonitic ores, resides in using aqueous sulfuric acid as the leachant at high temperature under elevated pressure, the raw ore being prepared in a finely divided state, then forming a slurry thereof at about 10% to 20% solids which is thereafter concentrated by settling and decanting in thickeners to produce an underflow having a concentration of about 40% to 50% solids. The concentrated slurry is heated in an autoclave by means of direct high pressure steam to a high temperature at which the leaching or other recovery treatment is carried out, usually above 400° F (205° C), e.g. about 475° F (246° C), at a pressure of about 525 psig in the presence of sulfuric acid to solubilize the nickel and cobalt present in the slurried ore. Following leaching in the autoclave, the leached pulp is cooled and preferably washed by countercurrent decantation and the resulting acid leach liquor then treated with a neutralizing agent [Mg(OH)$_2$, coral mud or the like] to raise the pH to, for example, 2.5 to 2.8 for the sulfide precipitation of nickel and cobalt. The leach liquor is brought to a temperature of about 250° F (122° C) and the nickel and cobalt precipitated as sulfides with H$_2$S at pressures of up to about 150 psig, using nickel sulfide as seed material.

The sulfide precipitate is washed and thickened to about 65% solids and then oxidized at about 350° F (177° C) and a pressure of about 700 psig in an autoclave in 1% sulfuric acid. Ammonia is added as a neutralizing agent to the nickel-cobalt solution to raise the pH to a level (e.g. 5.3) using air as an oxidant, to precipitate any iron, aluminum or chromium carried over as an impurity during leaching. After separating the solution from the precipitate, any copper, lead or zinc present therein is removed by precipitation as a sulfide, using H$_2$S as the precipitant, the solution being first adjusted with acid to lower the pH to about 1.5. The sulfide precipitate is then separated from the solution and the solution adjusted with ammonia to prepare it for the recovery of metallic nickel. The adjusted nickel feed solution containing about 40 to 50 grams per liter of nickel and some cobalt is reduced with hydrogen in an autoclave at about 375° F (190° C) and 650 psig using nickel powder as seed material, the barren liquor remaining going to cobalt recovery using known methods. However, some of the cobalt appears in the reduced nickel product.

Among the methods proposed and/or commercially used for separating cobalt from nickel is the method of separating cobalt from aqueous nickel-cobalt sulfate solutions by means of nickelic hydroxide, and the subsequent separation of cobalt from nickel in the resulting precipitate by means of the pentammine process described in U.S. Pat. Nos. 2,767,053 and 2,767,054, the cobalt in the precipitate being in the cobaltic state.

In one embodiment, the cobaltic precipitate which also contains nickel is solubilized as cobaltic pentammine and nickelous ammine by dissolving the cobaltic precipitate in an ammonium sulfate solution containing at least about 100 grams per liter of (NH$_4$)$_2$SO$_4$ at least about 50 grams NH$_3$ per liter (gpl) at a temperature ranging from about 80° to 120° C under a pressure of at least about 20 psi gage. This solution is then acidified to a pH of about 1.5 to 3.0 and cooled to produce a nickel-ammonium sulfate precipitate highly enriched in nickel.

While the foregoing technique is useful in the extraction and recovery of cobalt from mainstream nickel-cobalt sulfate solutions, it has certain disadvantages. For example, the cost of reagents for forming the pentammine is high.

Another method which has been employed to separate cobalt from solution is to use nickelic hydroxide to oxidize the cobaltous ion to the cobaltic state and then cause the precipitation thereof as cobaltic hydroxide.

It is known according to Czech Pat. No. 100,929 (Sept. 15, 1961) to purify sulfate electrolytes by ozone injection at 20° to 100° C wherein certain metal ions are oxidized and caused to hydrolyze from solution. Since free acid is generated during hydrolysis, an hydroxide or a carbonate of an appropriate basic metal is added during ozonation. Copper, lead, chloride ion, organic compounds, among others are simultaneously removed from solution. Similar processes for removing metals and non-metal impurities are disclosed in Czech Pat. Nos. 102,895 (Mar. 15, 1962) and 106,524 (Feb. 15, 1963).

In a paper entitled "Application of Ozone to Nickel Salt Production" by A. D. Tolstoguzov and Yu. N. Lozitskii [Tsvetnye Metally, 10, p. 25(1973)], ozone is used to precipitate cobalt from nickel sulfate solution using either nickel or sodium carbonate for neutralization. However, no mention is made of the presence of ammonium ions which is known to have an adverse effect on the reaction.

Prior ozonation processes for nickel-cobalt separation avoided solutions containing nitrogen in the −3 oxidation state. For example, ozone oxidizes ammonium hydroxide to ammonium nitrate at atmospheric pressure and temperature according to the following reaction:

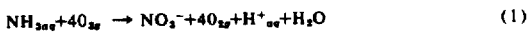

$$NH_{3aq} + 4O_{3g} \rightarrow NO_3^- + 4O_{2g} + H^+_{aq} + H_2O \qquad (1)$$

The higher the aqueous ammonia concentration, the higher the solution pH, and the higher the ozone concentration in the oxygen carrier gas, the further the foregoing reaction progresses. Thus, the presence of the ammonium ion, for example, as ammonium sulfate, in nickel-cobalt solutions interferes with the ozonation rejection of cobalt by consuming ozone before it can oxidize cobalt (or nickel, which in turn oxidizes cobalt).

We have found, however, that we can overcome the foregoing limitation. This limitation is a serious one when one considers that present hydrometallurgical processes for nickel recovery generate solutions containing ammonia from which cobalt must subsequently be removed.

OBJECTS OF THE INVENTION

It is an object of this invention to provide an ozonation process capable of efficiently separating cobalt from nickel values of various nickel-cobalt bearing solutions, e.g. nickel and cobalt-bearing sulfate solutions in the presence of nitrogen (−3) ions, such as the ammonium ion ($NH_4^{+1}$).

Another object is to provide an efficient ozonation process for separating cobalt from nickel-cobalt sulfate solutions and produce a filterable cobalt-containing precipitate, particularly from solutions containing ammonium ion, such as in the form of ammonium sulfate.

These and other objects will more clearly appear from the following disclosure and the accompanying drawing, wherein.

STATEMENT OF THE INVENTION

Stating it generally, the invention resides in a method of separating cobalt from a nickel solution containing cobalt in the cobaltous state and containing an ammonium salt, the ratio of nickel to cobalt in solution being at least about 5:1, the method comprising subjecting the solution to ozonation while maintaining the pH thereof from about 4.5 to 6, continuing the ozonation in the said pH range until said cobalt has been oxidized to the cobaltic state, and simultaneously precipitating said cobalt as a cobaltic precipitate, such as cobaltic hydroxide, at a temperature ranging from about 10° to 90° C. The temperature preferably ranges from about 30° to 70° C. Generally speaking, lower temperatures retard the rate of precipitation of the cobaltic aqueous species generated by ozone oxidation of cobaltous aqueous species. Higher temperatures accelerate the decomposition of ozone (prior to cobalt oxidation). Preferably, the pH is controlled from about 4.8 to 5.2 during the ozonation process.

By controlling the ozonation over the foregoing pH ranges, efficient separation of cobalt is effected, despite the presence of an ammonium salt, such as ammonium sulfate.

As stated hereinbefore, prior ozonation processes avoided solutions containing inorganic nitrogen in the (−3) oxidation state because of the high reactivity of reduced nitrogen with ozone, a reactivity that is accelerated by the presence of nickel ions. The inhibiting effect of ammonium sulfate will be clearly apparent by referring to FIG. 1 which illustrates the inhibiting effect of 10 grams/liter of ammonium sulfate on the rate of cobalt rejection by ozonation as compared to the same solution without ammonium sulfate.

Figure 1:
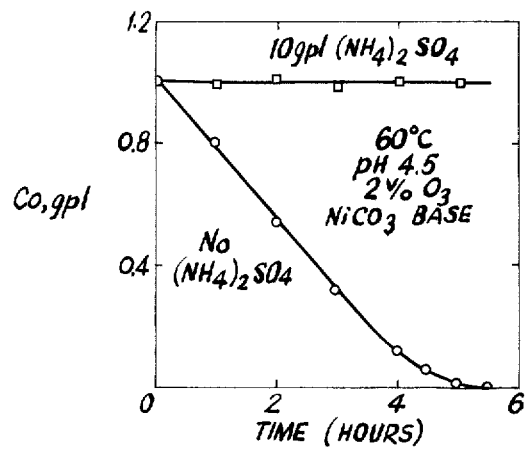
FIG. 1 depicts two curves illustrating the inhibiting effect of ammonium sulfate in the solution on the rate of cobalt rejection by ozonation.

The data of FIG. 1 were obtained under conditions set forth in Czech Pat. No. 100,929 using the suggested pH of below 6.9. The pH in the aforementioned experiment was 4.5. The solution was ozonated using a carrier gas of oxygen containing 2% $O_3$ (ozone) by volume and nickel carbonate employed to control the pH at 4.5. As will be noted, when ammonium sulfate is present, the cobalt was not rejected during ozonation; whereas, the test without ammonium sulfate showed that the cobalt in solution (about 1 gram/liter) was rejected in less than 6 hours.

Our improved method resides in the discovery of conditions under which the rate of cobalt oxidation is rapid despite the presence of ammonia or ammonia complexes. In this connection, both pH and temperature are important. Thus, by controlling the pH at about 4.5 to 6 and, more preferably, from about 4.8 to 5.2, in the presence of the ammonium ion, a relatively high rate of cobalt precipitation in the cobaltic state is obtainable. The cobaltic precipitate is a cobaltic hydrate, such as cobaltic hydroxide and variations thereof. The precipitate is readily filterable and is amenable to the recovery of the contained nickel and cobalt. Ozonation of hot solutions can precipitate cobalt more rapidly than ozonation of cold solutions as will be clearly apparent from the following.

DETAILS OF THE INVENTION

In carrying out the various tests, a standard set of operating conditions was defined. Thus, oxygen was employed as the carrier gas for ozone in which ozone was maintained at specified concentration. The electrolyte solution tested and the conditions are as follows:

| | |
|---|---|
| Initial $O_3$ Concentration | 2 Vol.% $O_3$ in oxygen |
| Initial Ni Concentration | 80 grams/liter (gpl) |
| Initial Co Concentration | 1 gpl |
| Initial Cu Concentration | 2 ppm |
| Initial Fe Concentration | 1 ppm |
| Ozone Injection Pressure | 9.8 psig |
| Ozone Injecting Rate | 10.3 g/hr |
| Reactor Temperature | 60° C |
| Acid Neutralizer | $NiCO_3$ |

As the addition of $NiCO_3$ causes the generation of $CO_2$ which dilutes the oxygen carrier gas, the carrier gas may be cycled through a $CO_2$ absorber to remove the $CO_2$ therefrom. Other carrier gases may comprise $N_2$ or mixtures of $N_2 - CO_2$. The concentration of ozone in the carrier gas may range from about 0.5 to 5% by volume.

Figure 2:
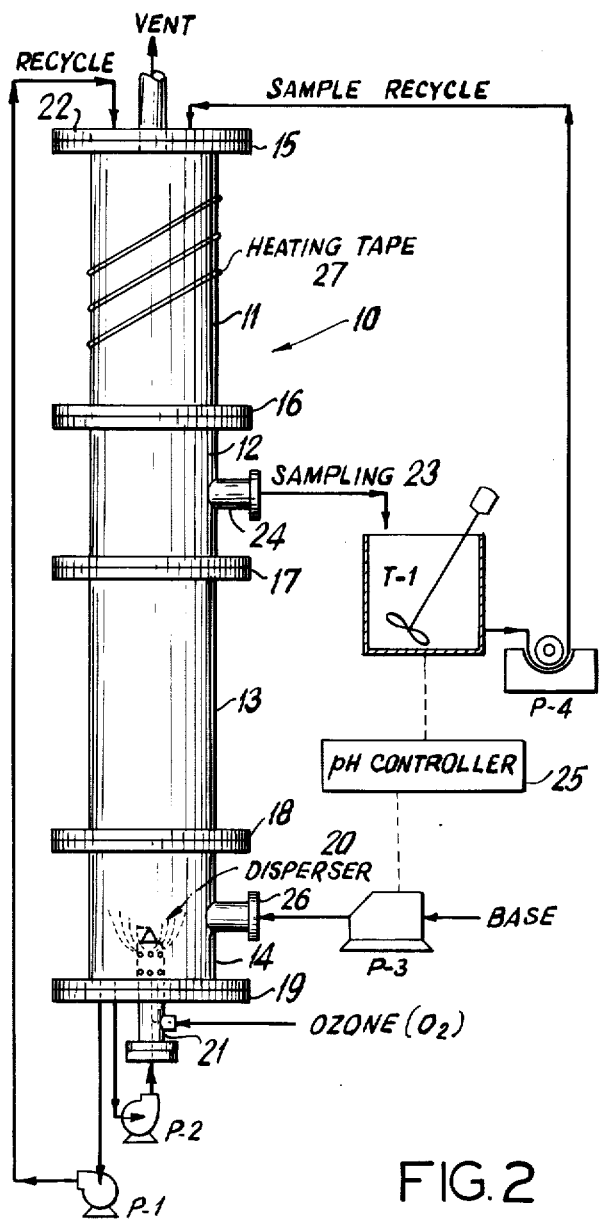
FIG. 2 is a schematic of an ozonation column employed in carrying out the invention.

The ozonation of the slurry is carried out in ozone columns of the type shown schematically in FIG. 2 comprising 20 foot high Corning Glass columns (one 3 inches in diameter and the other 6 inches in diameter). The column 10 depicted in FIG. 2 comprises sections of glass cylinders 11, 12, 13 and 14 connected together via connecting flanges 15 to 19. An ozone disperser 20 comprising a dispersing nozzle is coupled to inlet pipe 21 through which ozone (in oxygen) is fed by means of electrolyte solution recycled via pump P-2 through the pipe to effect dispersion of the ozonated gas through dispersing nozzle 20 as fine bubbles in the slurry.

In the meantime, the slurry is recycled from the bottom of the column via pump P-1 to the top of the column 22. The slurry is sampled at 23 from outlet port 24, the slurry going into mixing chamber T-1 from there, a portion to filter P-4 and the remaining portion recycled to the top of the column. A pH controller 25 well known to the art is cooperably related to the mixture for determining the pH of the solution during ozonation, the pH controller operating means P-3 for adding a base, e.g. nickel carbonate, to the column via inlet port 26 sufficient to maintain the pH at the desired level. The column 10 has wrapped around it an electrical resistance heating tape to maintain the temperature of the solution at the desired level.

Using the foregoing standard conditions except for the temperature, a series of tests was conducted at 15° and 60° C on the aforementioned solution containing 5 and 10 gpl of ammonium sulfate. The results obtained are as follows:

TABLE 1

| Temp. °C | pH | $(NH_4)_2SO_4$ gpl | Co Precipitation Rate gr Co/gr $O_3$/hour |
|---|---|---|---|
| 15 | 5.2 – 5.4 | 5 | 1.1 |
| 15 | 5.2 – 5.4 | 10 | 1.1 |
| 60 | 5.2 – 5.4 | 5 | 2.7 |
| 60 | 5.2 – 5.4 | 10 | 2.4 |

As will be noted, more than double the cobalt precipitation rate is obtained at 60° as compared to 15° C. Over double the rate was also obtained at 45° C. Preferably, the temperature should be at least about 35° C. Rate of precipitation is determined by measuring the slope of the linear portion of the rate curve (see FIG. 1) and not by the total time required to reject substantially all of the cobalt.

During ozonation, ozone is transferred from the gas to the aqueous phase (reaction) followed by oxidation of either $NiCO_3$ or $Co^{+2}$ as follows:

(2)

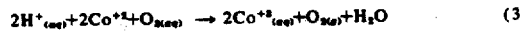

(3)

(4)

Reactions (3) and (4) can consume ozone as fast as it is supplied to either the hot or cold electrolyte. The oxidized nickel solid product produced by reaction (4) oxidizes cobaltous ion to cobaltic as follows:

(5)

The cobaltic ion produced by either reaction (3) or (5) reacts with water to precipitate cobalt as a cobaltic hydrate precipitate from solution, such as shown below:

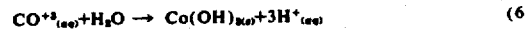

(6)

Reactions (5) and (6) do not keep up with reactions (3) and (4) unless the solution is heated. As will be appreciated, the cobaltic hydrate may take on various forms, the hydroxide being the most common.

Thus, as one feature of the invention, the reaction may be carried out in a hot solution during which the cobaltic ion is precipitated as the cobaltic hydrate; or, as a second feature, reactions (2), (3) and (4) may be carried out in a cool solution and the oxidized slurry then heated in a separate reactor to precipitate cobalt vis a vis reactions (5) and (6).

Carrying out reaction (2) in a cold liquor is important when treating solutions of high metal concentration. The solubility of ozone in solutions of high ionic strength is low and heating such solutions reduces this solubility rather sharply. Ozone solubility is important in that reactions (3) and (4) proceed no faster than the ozone can be dissolved. Apparently, it appears that the gain in ozone solubility attained at low temperatures improves the driving force of ozone diffusion [reaction (2)] and thus maximizes the rate of reactions (3) and (4). However, reactions (5) and/or (6) are very slow at low temperatures. Therefore, the ozonated slurry for optimum efficiency should be heated to at least 25° and preferably to 60° C after being discharged from the ozonator to precipitate the cobalt.

Neutralization of the solution during ozonation should be carefully executed. Since the pH is controlled from about 4.5 to 6, strong base solutions should not be used, otherwise local high pH conditions occur at the moment of addition which is undesirable because of excess nickel coprecipitation and ozone consumption by attack of nitrogen (−3) species (which is favored by high pH). Weak bases such as $NiCO_3$, $Na_2CO_3$, $ZnCO_3$, and the like, are preferred as they provide good buffering control of the pH. However, alkali metal hydroxides may be employed so long as the solutions are weak. Ammonium hydroxide is not desirable as will be pointed out hereinafter.

The invention is particularly applicable to pregnant leach solutions containing anywhere from about 3 gpl to about 100 gpl of nickel, about 0.01 gpl to 10 gpl cobalt, and at least about 0.2 gpl of ammonium ion or in the form of at least about 0.8 gpl of ammonium sulfate. Where the pregnant solutions contain iron and/or copper, it is preferred that these metal ions be removed prior to ozonation. As stated hereinbefore, the nickel to cobalt ratio in solution is at least about 5:1.

Figure 3:
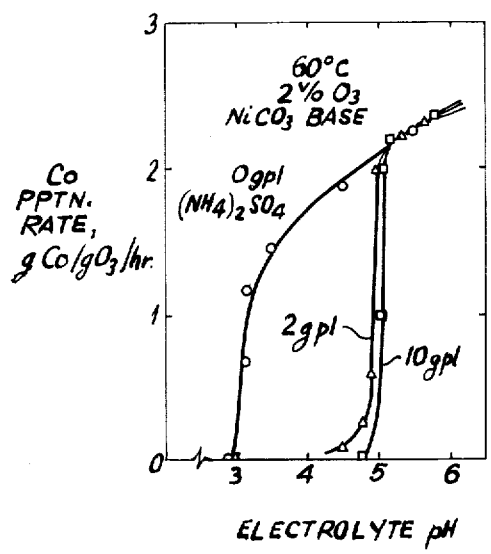
FIG. 3 depicts via a set of curves the cobalt precipitation rate as a function of electrolyte pH with and without ammonium sulfate.

As further stated herein, the cobalt precipitation reaction generates acid and is, therefore, pH sensitive. The higher the pH (up to about 6, above which nickel tends to hydrolyze), the greater is the rate at which cobalt can be rejected by ozonation. In this connection, reference is made to FIG. 3. As will be noted, in the absence of ammonium ion, effective cobalt precipitation is achieved above a pH of 3. However, in the presence of ammonium ion, the pH should at least be or exceed about 4.5. The marked behavior of ammonium sulfate on the pH for precipitating cobalt at a fairly high rate is clearly apparent from FIG. 3. The solution tested contained 80 gpl Ni, 1 gpl Co, the ozonation being carried out at 60° C at a rate of 4 liters of gas flow per minute in a column 6 inches in diameter using oxygen containing 2% by volume of ozone and also nickel carbonate as the neutralizer.

Tests have shown that such bases as $(NH_4)_2CO_3$, $NiCO_3$ and KOH were compatible with the ozonation process with the exception of ammonium hydroxide. This will be apparent from FIGS. 4 and 5 which illustrate the effect of various types of bases on the rate of cobalt precipitation.

Figure 4:
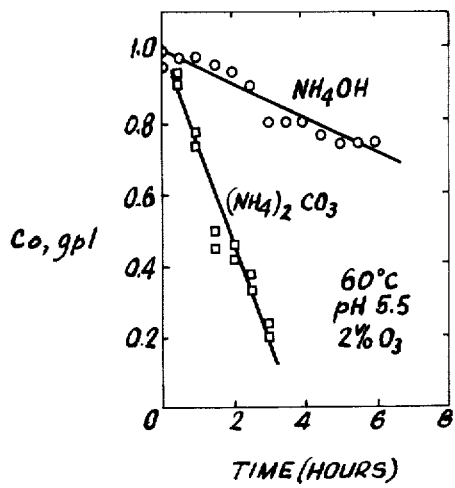
FIGS. 4 and 5 are illustrative of the effect of different neutralizers in carrying out the ozonation process.
Figure 5:
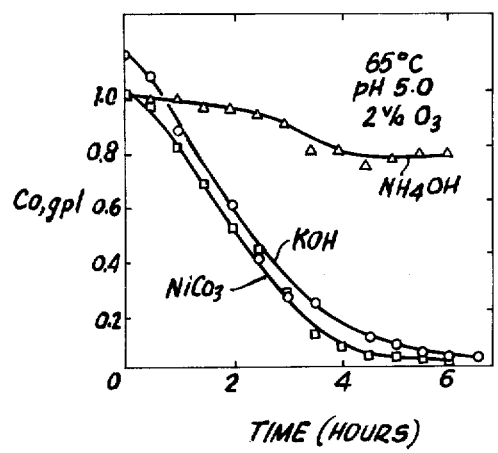

Referring to FIG. 4, the use of $(NH_4)_2CO_3$ as the neutralizer during ozonation resulted in a rapid precipitation of cobaltic hydroxide, while ammonium hydroxide was inferior. Likewise, referring to FIG. 5, $NiCO_3$ and KOH were similarly superior to ammonium hydroxide.

Generally speaking, as the nickel content in the starting solution increases, the time to reach substantially complete rejection of the cobalt also increases. Thus, at 63 gpl nickel, the time at 35° C is 90 minutes; whereas, at 90 gpl nickel and 35° C, the time is 210 minutes (for solutions containing 10 gpl $(NH_4)_2SO_4$, 2°/o $O_3$ and 1 gpl initial $Co^{++}$). Preferably, nickel solutions treated in accordance with the invention should not exceed 85 gpl and, more preferably, not exceed 70 gpl.

Ozonation tests conducted on a sulfate solution containing 60 gpl Ni, 1 gpl Co 10 gpl of $(NH_4)_2SO_4$, 2°/o $O_3$ in oxygen at an ozone feed rate of 2 and 4 liters per minute, respectively, into the solution in the 3 inch diameter column showed that the higher feed rate of ozone resulted in a shorter time (150 minutes at 4 liters per minute as against 235 minutes at 2 liters per minute) to effect substantially complete rejection of cobalt as evidenced by a Ni/Co ratio in the final solution of 3000:1, the starting solution having a Ni/Co ratio of 60:1.

Tests have also shown that, as the amount of cobalt in the starting solution increases from say 1 gpl to 5 gpl cobalt, the time required to reach a Ni/Co ratio in the final solution of 3000:1 also increases (although not proportionately).

The results of a series of tests conducted in the 20 foot 3 inch diameter column used oxygen containing 2% ozone are given in Tables 4 and 5 as follows:

Table 4

| Test No. | Gas Flow Liters/Min. | Ni Gpl | $(NH_4)_2SO_4$ Gpl | pH | Temp. 20° C | Time for Ni/Co of 3000:1 |
|---|---|---|---|---|---|---|
| 1 | 4 | 63 | 10 | 5.5 | 35 | 90 |
| 2 | 4 | 63 | 10 | 5.5 | 35 | 105 |
| 3 | 4 | 90 | 10 | 5.5 | 35 | 210 |
| 4 | 4 | 63 | 10 | 5.5 | 70 | 180 |
| 5 | 4 | 76 | 10 | 5.5 | 70 | >400 |
| 16 | 2 | 60 | 10 | 5.5 | 35 | 235 |

Table 5

| Test No. | Gr $O_3$/gr Co at Ni/Co of 3000 | % $O_3$ Consumed | % $O_3$ Efficiency | Cobaltic Ppt. % Ni | Cobaltic Ppt. % Co | Gr $NiCO_3$ per gr Co |
|---|---|---|---|---|---|---|
| 1 | 0.70 | 89 | 58 | 41 | 9.1 | 13.0 |
| 2 | 0.81 | 89 | 50 | 43 | 9.0 | 15.0 |
| 3 | 1.7 | 91 | 24 | 41 | 7.0 | 17.0 |
| 4 | 1.3 | 95 | 31 | 41 | 8.1 | 15.0 |
| 5 | 3.6 | — | <11 | 48 | 4.0 | 31.0 |
| 16 | 1.0 | 95 | 40 | 42 | 8.5 | 15.0 |

In all of the foregoing tests, low-ammonia nickel carbonate was employed as the neutralizer. Generally speaking, the cobaltic precipitate formed at 70° C seems to filter better than the precipitate formed at 35° C. Apparently, this difference is very likely due to coagulation of the precipitate at higher temperatures.

Ammonium carbonate can be used as a neutralizing agent so long as the pH is controlled at about 4.5 to 6 and so long as the total ammonium ion in solution does not exceed 7 gpl.

The advantage of using nickel carbonate as the neutralizer is that it enables cobalt removal to proceed uninhibited to completion at a rate at least as fast as that achieved with KOH but without the introduction of objectionable ions into the system. Being a solid buffer, $NiCO_3$ can be added to the system in excess and still maintain an appropriate pH level for the process. In addition, nickel carbonate appears to act as a nucleating agent in the system as well as a filter aid. Also, a further advantage is that nickel carbonate does not add to the total ammonium concentration in the system; nor does it contaminate the solution as would a carbonate of another metal.

As stated hereinbefore, it is preferred to precipitate the cobalt in hot solutions, for example, at a temperature of about 35° to 80° C and generally from about 35° to 70° C, the preferred temperature being at the lower portion of said temperature range.

An advantage of the invention is that substantially complete precipitation or rejection of cobalt is achieved. As stated earlier, the cobalt-containing nickel solution, for example, a solution containing 60 grams/liter nickel and 1 gram/liter cobalt in which the Ni/Co ratio is 60:1 was rejected in cobalt content to provide a purified nickel solution with a Ni/Co ratio of 3000:1. Thus, the invention is capable of producing a final nickel solution in which the Ni/Co ratio is at least about 1000:1 and preferably at least about 2000:1.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of separating cobalt from a nickel solution containing cobalt in the cobaltous state and at least about 0.1 grams/liter of ammonium ion, the nickel to cobalt ratio in solution being at least about 5:1, which comprises, subjecting said solution to ozonation while controlling the pH thereof from about 4.5 to 6 by the addition of a base other than ammonium hydroxide, and continuing said ozonation in said pH range until said cobalt has been oxidized to the cobaltic state and precipitated as a cobaltic hydrate at a temperature of at least about 10° C.

2. The method of claim 1, wherein said pH is controlled from about 4.8 to 5.2 during said ozonation.

3. The method of claim 2, wherein the ammonium ion concentration ranges up to about 7 grams/liter.

4. The method of claim 3, wherein said nickel solution is a sulfate solution containing from about 3 to 100 grams/liter nickel and about 0.01 to 10 grams/liter cobalt.

5. The method of claim 1, wherein the temperature for cobalt precipitation ranges up to about 90° C.

6. The method of claim 3, wherein said base is nickel carbonate.

7. The method of claim 1, wherein the temperature ranges from about 30° to 70° C.

* * * * *